(12) United States Patent
Tsuchitoi

(10) Patent No.: US 10,379,795 B2
(45) Date of Patent: Aug. 13, 2019

(54) INFORMATION PROCESSING APPARATUS CAPABLE OF REDUCING DAMAGE CAUSED BY INVALID EXECUTION DATA, CONTROL METHOD THEREFOR, AND STORAGE MEDIUM

(71) Applicant: CANON KABUSHIKI KAISHA, Tokyo (JP)

(72) Inventor: Naoki Tsuchitoi, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/906,213

(22) Filed: Feb. 27, 2018

(65) Prior Publication Data

US 2018/0253269 A1 Sep. 6, 2018

(30) Foreign Application Priority Data

Mar. 3, 2017 (JP) .................. 2017-040454

(51) Int. Cl.
| | |
|---|---|
| *G06F 3/12* | (2006.01) |
| *H04N 1/333* | (2006.01) |
| *H04N 1/44* | (2006.01) |
| *H04L 29/12* | (2006.01) |
| *G06F 21/60* | (2013.01) |
| *H04N 1/00* | (2006.01) |

(52) U.S. Cl.
CPC .......... *G06F 3/1238* (2013.01); *G06F 3/1207* (2013.01); *G06F 3/1218* (2013.01); *G06F 3/1222* (2013.01); *G06F 3/1231* (2013.01); *G06F 3/1287* (2013.01); *G06F 21/608* (2013.01); *H04L 61/2007* (2013.01); *H04N 1/3333* (2013.01); *H04N 1/4433* (2013.01); *H04L 61/2038* (2013.01); *H04N 1/0088* (2013.01); *H04N 2201/3219* (2013.01)

(58) Field of Classification Search
None
See application file for complete search history.

(56) References Cited

U.S. PATENT DOCUMENTS

| | | | |
|---|---|---|---|
| 9,733,874 B2 * | 8/2017 | Saito | G06F 3/1222 |
| 2010/0235883 A1 * | 9/2010 | Sato | H04N 1/00408 726/3 |
| 2014/0293833 A1 * | 10/2014 | Hama | H04L 65/1069 370/259 |

FOREIGN PATENT DOCUMENTS

JP 2016119581 A 6/2016

\* cited by examiner

*Primary Examiner* — Henok Shiferaw
(74) *Attorney, Agent, or Firm* — Rossi, Kimms & McDowell LLP

(57) ABSTRACT

An information processing apparatus which is capable of reducing damage caused by invalid execution data received via a public network. The information processing apparatus carries out either communications using the public network or communications without using the public network with an external apparatus. An IP address assigned to the information processing apparatus is stored. Execution data for executing a job is received from the external apparatus. When the IP address assigned to the information processing apparatus is a global IP address that is for use in the communications using the public network, a setting is made to restrict execution of the execution data.

9 Claims, 6 Drawing Sheets

INFORMATION PROCESSING APPARATUS CAPABLE OF REDUCING DAMAGE CAUSED BY INVALID EXECUTION DATA, CONTROL METHOD THEREFOR, AND STORAGE MEDIUM

BACKGROUND OF THE INVENTION

Field of the Invention

The present invention relates to an information processing apparatus, a control method therefor, and a storage medium storage.

Description of the Related Art

There is known an MFP which is an information processing apparatus carrying out data communications with communication apparatuses such as PCs (personal computers). The MFP carries out data communications with the communication apparatuses to, for example, receive print data for executing a print job from the communication apparatuses and also cause the communication apparatuses to display, for example, setting information on the MFP. The MFP is connected to both of a local network and a global network and carries out data communications with the communication apparatuses connected to those networks. In the local network, the MFP carries out data communications with only the communication apparatuses connected to the MFP within a limited area such as an office without using a public network such as the Internet. On the other hand, in the global network, the MFP carries out data communications with communication apparatuses connected to the public network.

In communications over the global network, global IP addresses uniquely assigned to respective apparatuses are used to identify the party at the end of communication. A global IP address unique to an MFP and for identifying the MFP is assigned to the MFP connected to the global network, and the global IP address of the MFP is exposed to an indefinite number of communication apparatuses connected to the global network. For this reason, there may be a situation in which a malicious user accesses the MFP by using the global IP address of the MFP which is exposed to the public and sees setting information on the MFP. To address this problem, there has conventionally been a technique that restricts provision of some information in a case where a global IP address is assigned to the MFP (see, for example, Japanese Laid-Open Patent Publication No. 2016-119581). This technique makes it possible to avoid a situation in which setting information on the MFP is leaked out.

The technique described in Japanese Laid-Open Patent Publication No. 2016-119581 above would cause a disadvantage when invalid execution data is received via the public network although a situation in which setting information on the MFP is lead out can be avoided. For example, when a malicious user sends a large amount of invalid print data to the MFP by using a global IP address of the MFP which is exposed to the public, the MFP performs printing on all of the print data it has received, and as a result, a large amount of unnecessary prints are produced. Namely, the conventional MFP cannot reduce damage caused by invalid execution data received via the public network.

SUMMARY OF THE INVENTION

The present invention provides an information processing apparatus and an image communication method therefor, which are capable of reducing damage caused by invalid execution data received via a public network, as well as a storage medium.

Accordingly, the present invention provides an information processing apparatus that carries out either communications using a public network or communications without using the public network with an external apparatus, comprising a storage unit configured to store an IP address assigned to the information processing apparatus, a receiving unit configured to receive execution data for executing a job from the external apparatus, and a setting unit configured to, when the IP address assigned to the information processing apparatus is a global IP address that is for use in the communications using the public network, make a setting to restrict execution of the execution data.

According to the present invention, damage caused by invalid execution data received via a public network is reduced.

Further features of the present invention will become apparent from the following description of exemplary embodiments (with reference to the attached drawings).

DESCRIPTION OF THE EMBODIMENTS

Embodiments of the present invention will now be described in detail with reference to the accompanying drawings.

First, a description will be given of an information processing apparatus according to a first embodiment of the present invention.

It should be noted that in the following description of the present embodiment, the present invention is applied to an MFP which carries out data communications via a public network, but the present invention may be applied to other apparatuses such as PCs which are capable of carrying out data communications via a public network.

Figure 1:
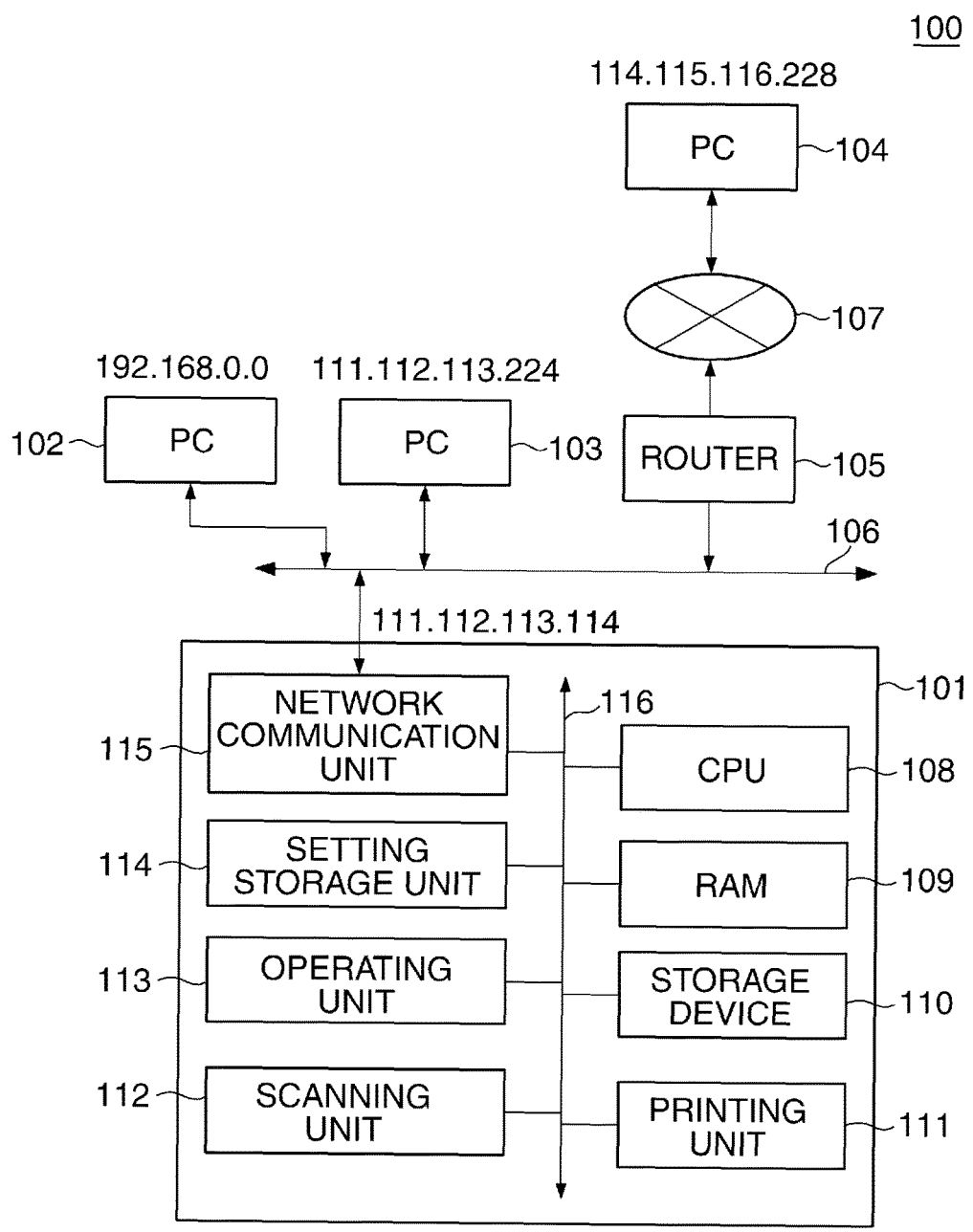
FIG. 1 is a block diagram schematically showing an arrangement of a communication system including an MFP which is an information processing apparatus according to a first embodiment of the present invention.

FIG. 1 is a block diagram schematically showing an arrangement of a communication system 100 including the MFP 101 which is the information processing apparatus according to the first embodiment of the present invention.

Referring to FIG. 1, the communication system 100 has the MFP 101 and PCs 102 to 104. The MFP 101, the PC 102, and the PC 103 are connected to one another via a LAN 106, and the PC 104 is connected to the LAN 106 via the Internet 107 and a router 105.

The MFP 101 is an image forming apparatus, which carries out an image forming process, and executes jobs such as printing and scanning. The MFP 101 also carries out data communications with the PCs 102 to 104. It should be noted that an internal arrangement of the MFP 101 will be described later. The PCs 102 to 104 have a communication function and carry out data communications with the MFP 101. For example, the PCs 102 to 104 send execution data, which are for executing jobs, to the MFP 101. The execution data are, for example, print data for executing a print job. The PCs 102 to 104 also display an operating screen for viewing and editing a variety of setting information.

In the communication system 100, the MFP 101 carries out data communications with apparatuses to which the MFP 101 is connected via the LAN 106, and more specifically, the PC 102 and the PC 103 without the Internet 107 (hereafter referred to as "the local network communications"). The local network communications are, for example, in-house network communications permitted for only specific apparatuses and ensure a certain level of security. The MFP 101 also carries out data communications with the PC 104 via the LAN 106 via the Internet 107 (hereafter referred to as "the global network communications").

In the local network communications and the global network communications, IP addresses uniquely assigned to respective apparatuses are used to identify the party at the other end of the communication. The IP addresses are categorized as private IP addresses and global IP addresses as shown in Table 1 below.

TABLE 1

|  | IP address space (for IPv4) | IP address space (for IPv6) | Risk of unauthorized intrusion from the Internet |
|---|---|---|---|
| Private IP address | 10.0.0.0-10.255.255.255 172.16.0.0-172.31.255.255 192.168.0.0-192.168.255.255 | fc00::/7 | No |
| Global IP address | Other than the above | Other than the above | Yes |

Private IP addresses are used for the local network communications. Private IP addresses are not used for the global network communications, and hence the private IP addresses are never exposed to external apparatuses connected to the Internet 107. For this reason, when, for example, a private IP address is assigned to the MFP 101, no unauthorized access from external apparatuses is made to the MFP 101 via the Internet 107.

A global IP address includes information on a network to which an apparatus with the global IP address assigned thereto belongs. A global IP address is used for the global network communications as well as the local network communications, and hence it may be exposed to an indefinite number of external apparatuses connected via the Internet 107. In this case, when, for example, a global IP address is assigned to the MFP 101, it is feared that a malicious user will make unauthorized access to the MFP 101 by using the global IP address of the MFP 101 exposed to the public. It should be noted that the present embodiment is based on the assumption that, for example, a global IP address (111.112.113.114) is assigned to the MFP 101. The present embodiment is also based on the assumption that it is feared that a malicious user will make unauthorized access to the MFP 101. On the other hand, it is assumed that IP addresses for carrying out the local network communications with the MFP 101 are assigned to the PC 102 and the PC 103, and more specifically, a private IP address (192.168.0.0) is assigned to the PC 102, and a global IP address (111.112.113.224), which indicates the same network to which the MFP 101 belongs, is assigned to the PC 102. It is also assumed that a global IP address (115.115.116.228), which indicates a network different from the network to which the MFP 101 belongs, is assigned to the PC 104.

A description will now be given of an arrangement of the MFP 101.

Referring to FIG. 1, the MFP 101 has a CPU 108, a RAM 109, a storage device 110, a printing unit 111, a scanning unit 112, an operating unit 113, a setting storage unit 114, and a network communication unit 115 (receiving unit). The CPU 108, the RAM 109, the storage device 110, the printing unit 111, the scanning unit 112, the operating unit 113, the setting storage unit 114, and the network communication unit 115 are connected to one another via a system bus 116.

Figure 2:
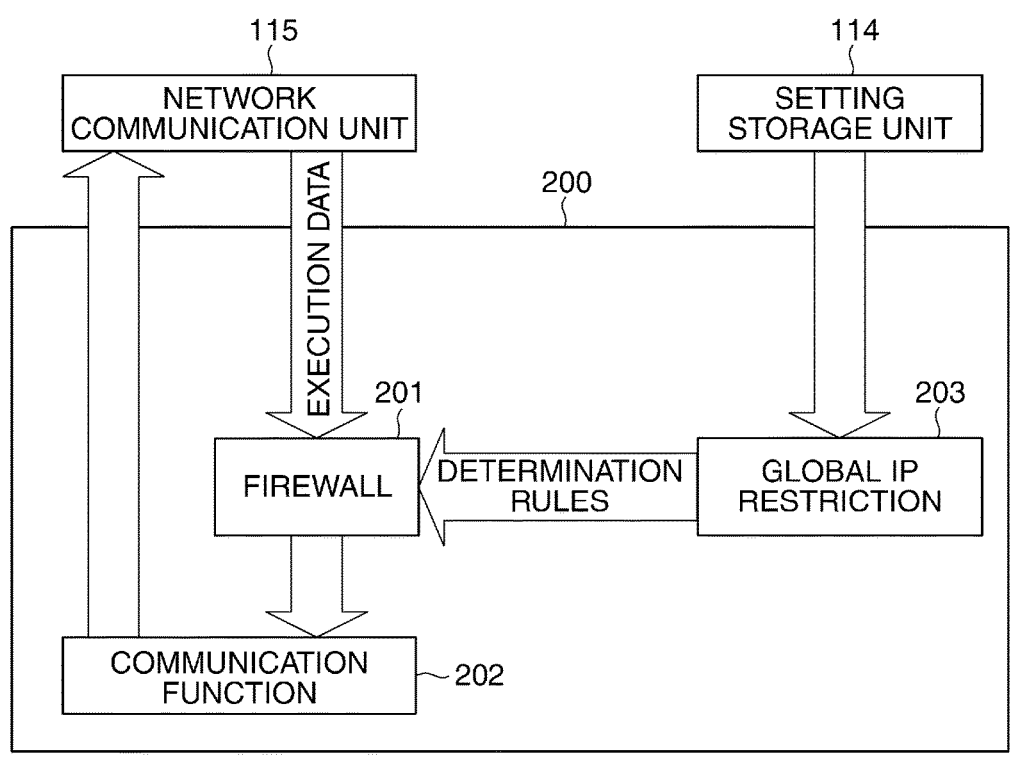
FIG. 2 is a block diagram schematically showing an arrangement of software modules of the MFP in FIG. 1.

The CPU 108 carries out processes of software modules 200 in FIG. 2 for performing functions of the MFP 101. The RAM 109 is used as a work area for the CPU 108 and also used as a temporary storage area for each piece of data. The storage device 110 stores programs, which are executed by the CPU 108, and each piece of data. The printing unit 111 performs printing on sheets based on obtained print data. The scanning unit 112 reads originals mounted on an original platen glass, not shown. The operating unit 113 has a display unit and a plurality of operating keys, which are not shown. The operating unit 113 displays, on the MFP 101, for example a setting screen for configuring settings on the display unit or the like, and receives input information input by a user operating the operating keys. The setting storage unit 114 stores setting data on the MFP 101, and for example, stores address information including an IP address of the MFP 101. The network communication unit 115 controls data communications with the PCs 102 to 104. For example, the network communication unit 115 receives execution data from the PCs 102 to 104.

FIG. 2 is a block diagram schematically showing an arrangement of the software modules 200 of the MFP 101 in FIG. 1.

Referring to FIG. 2, the software modules 200 include a firewall module 201, a communication function module 202, and a global IP restriction module 203. The processes of the software modules 200 are carried out by the CPU 108 executing programs stored in the storage device 110.

The firewall module 201 determines whether or not the MFP 101 is to execute execution data received from the PCs 102 to 104. The execution data include IP addresses assigned to apparatuses which are senders. Specifically, the firewall module 201 obtains execution data, which was received by the MFP 101, from the network communication unit 115, and based on determination rules in Table 2 below, determines whether or not to output the obtained execution data to the communication function module 202.

TABLE 2

| Rule 1 | All of received data | Deny |
|---|---|---|
| Rule 2 | Received from a private IP address | Permit |
| Rule 3 | Received from the same network | Permit |

The determination rules include criteria by which to determine whether or not to output the execution data to the communication function module 202, and they are set by the global IP restriction module 203. The firewall module 201 reads the determination rules on a row-by-row basis from the first row, for example, from the row of Rule 1 in Table 2 and successively carries out processes described in the rules that have been read.

The communication function module 202 carries out a predetermined communication process based on the execution data obtained from the firewall module 201. The predetermined communication process is, for example, a process in which configuration information on the MFP 101 or the like is obtained by using a communication protocol such as SNMP (Simple Network Management Protocol) or a process in which classified information such as document data held by the MFP 101 is obtained. It should be noted that in the present embodiment, there may be a plurality of communication function modules 202 so as to perform different functions according to respective network communication port numbers.

The communication function module 202 also sends a result obtained by carrying out the predetermined communication process to the network communication unit 115. The global IP restriction module 203 sets the determination rules based on the IP address of the MFP 101.

Figure 3:
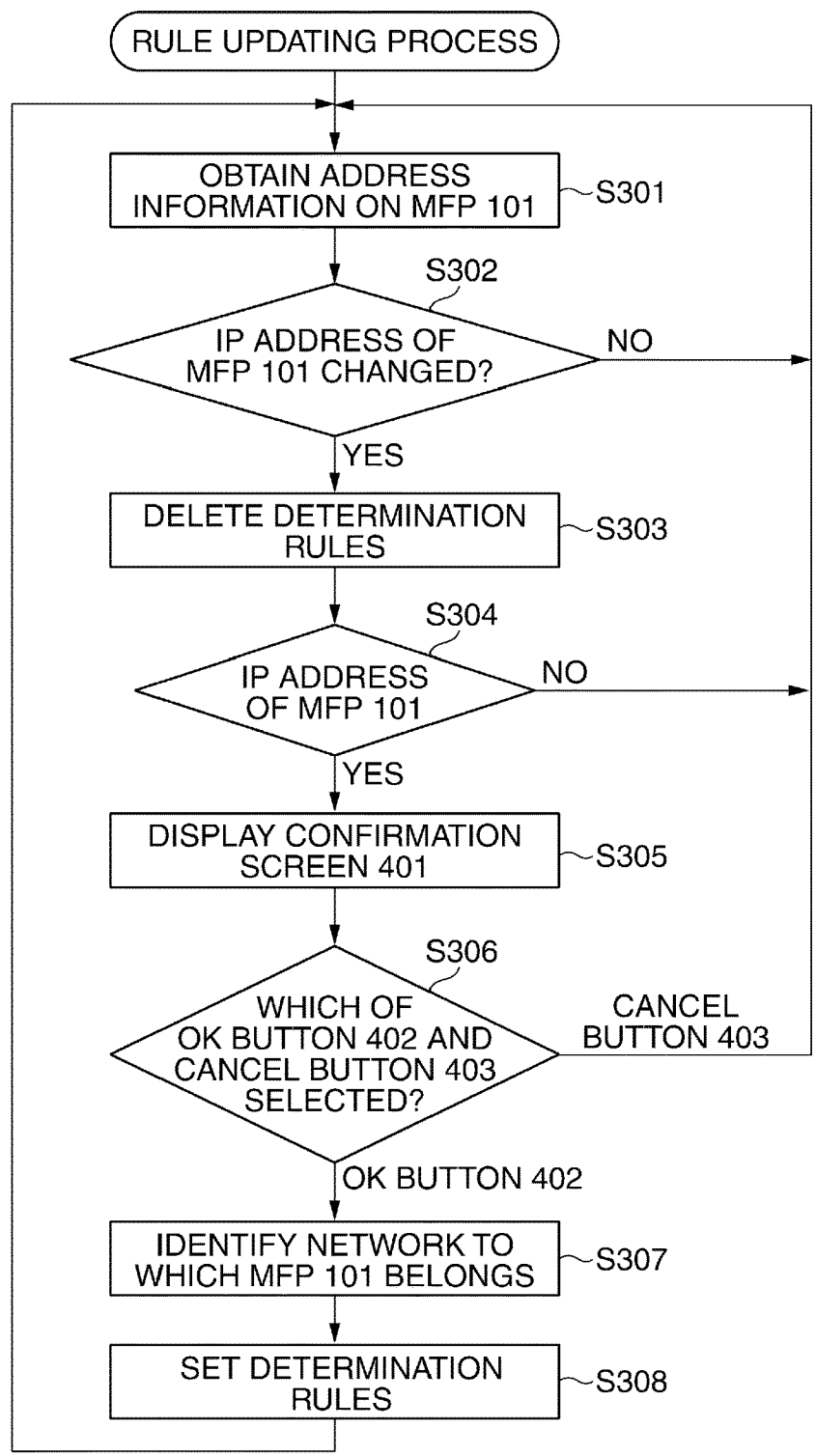
FIG. 3 is a flowchart showing the procedure of a rule updating process which is carried out by the MFP in FIG. 1.

FIG. 3 is a flowchart showing the procedure of a rule updating process which is carried out by the MFP 101 in FIG. 1.

The rule updating process in FIG. 3 is carried out by the CPU 108 executing programs stored in the storage device 110. The rule updating process in FIG. 3 is carried out continuously from startup of the MFP 101 to shutdown of the MFP 101. It should be noted that in the following description, it is assumed that determination rules are set in advance for an IP address of the MFP 101 at a certain point.

Referring to FIG. 3, first, the CPU 108 obtains address information on the MFP 101 from the setting storage unit 114 (step S301). The address information includes an IP address of the MFP 101 and a subnet mask for identifying a network represented by the IP address. The address information is information that is set by the user operating the operating unit 113 or is automatically assigned by using DHCP (Dynamic Host Configuration Protocol).

Next, based on the obtained address information, the CPU 108 determines whether or not the IP address of the MFP 101 has been changed (step S302). In the step S302, when, for example, the IP address included in the obtained address information is different from the IP address at the time when the determination rules were set, the CPU 108 determines that the IP address of the MFP 101 has been changed. On the other hand, when the IP address included in the obtained address information is the same as the IP address at the time when the determination rules were set, the CPU 108 determines that the IP address of the MFP 101 has not been changed.

As a result of the determination in the step S302, when the IP address of the MFP 101 has not been changed, the CPU 108 returns to the process in the step S301. On the other hand, as a result of the determination in the step S302, when the IP address of the MFP 101 has been changed, the CPU 108 deletes the determination rules set in advance (step S303). Then, the CPU 108 determines whether or not the IP address of the MFP 101 is a global IP address (step S304). In the step S304, for example, when the IP address included in the obtained address information matches any of the private IP addresses shown in Table 1, the CPU 108 determines that the IP address of the MFP 101 is not a global IP address. On the other hand, when the IP address included in the obtained address information does not match any of the private IP addresses shown in Table 1, the CPU 108 determines that the IP address of the MFP 101 is a global IP address.

Figure 4:
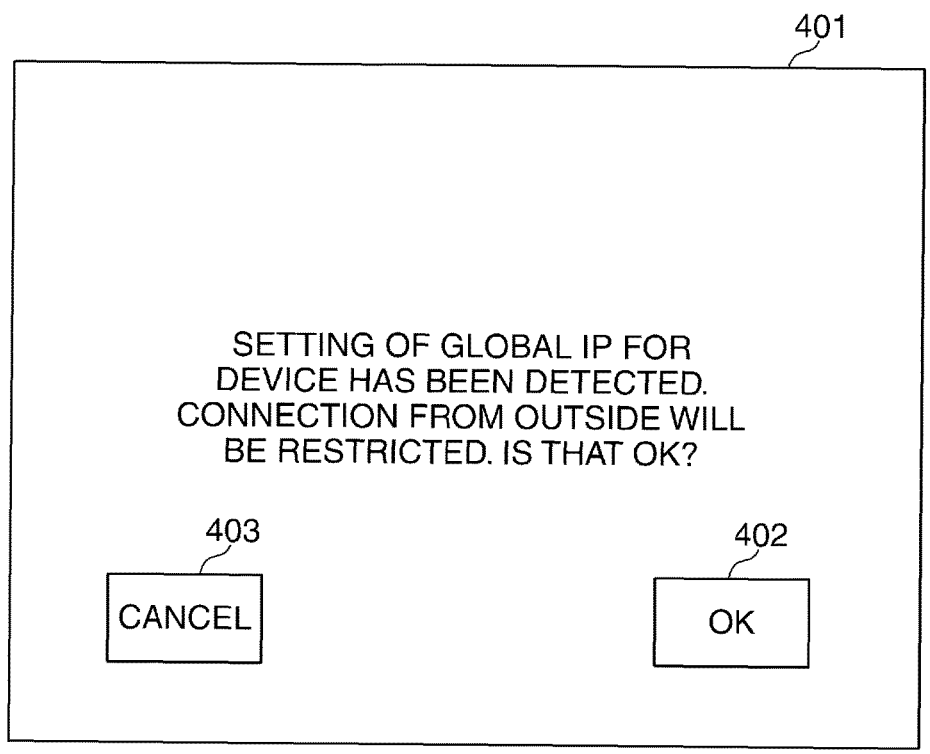
FIG. 4 is a view showing an example of a confirmation screen which is displayed on an operating unit in FIG. 1.

As a result of the determination in the step S304, when the IP address of the MFP 101 is not a global IP address, the CPU 108 returns to the process in the step S301. On the other hand, as a result of the determination in the step S304, when the IP address of the MFP 101 is a global IP address, the CPU 108 displays a confirmation screen 401 in FIG. 4 on the operating unit 113 (step S305). The confirmation screen 401 notifies the user that execution of execution data is to be restricted due to the change in the IP address of the MFP 101. The confirmation screen 401 has an OK button 402 and a cancel button 403. The OK button 402 is for indicating consent to restrict execution of execution data, and the cancel button 403 is for indicating an instruction to cancel an operation on the confirmation screen 401. Then, upon detecting a selecting operation performed by the user on the confirmation screen 401, the CPU 108 determines which of the OK button 402 and the cancel button 403 has been selected (step S306).

As a result of the determination in the step S306, when the cancel button 403 has been selected, the CPU 108 returns to the process in the step S301. On the other hand, as a result of the determination in the step S306, when the OK button 402 has been selected, the CPU 108 identifies a network to which the MFP 101 belongs based on the obtained address information (step S307). In the step S307, the network to which the MFP 101 belongs is identified by logical ANDing the IP address and the subnet mask included in the address information. For example, when the IP address and the subnet mask included in the address information are (111.112.113.114) and (225.225.225.0), the network to which the MFP 101 belongs is (111.112.113.0).

Then, the CPU 108 sets determination rules (step S308). As a result, in the MFP 101, execution of execution data received from external apparatuses is restricted according to the set determination rules. For example, when the MFP 101 receives execution data in a case where Rules 1 to 3 are set as shown in Table 2, the MFP 101 follows Rule 1 and determines whether or not to execute the execution data based on an IP address of a sender of the execution data without immediately executing the execution data. Execution data received from an apparatus that ensures a certain level of security in data communications such as an apparatus that applies to Rule 2, for example, the PC 102 or an apparatus that applies to Rule 3, for example, the PC 103 is very unlikely to be invalid execution data and is thus highly reliable execution data, and hence the MFP 101 executes the execution data. On the other hand, execution data received from an apparatus that apply to neither Rule 2 nor Rule 3, for example, the PC 104 is likely to be invalid execution data, and therefore, the MFP 101 does not execute the execution data. After that, the CPU 108 returns to the process in the step S301.

According to the present embodiment described above, when the IP address of the MFP 101 is a global IP address, execution of received execution data is restricted. This prevents all of received execution data from being executed and therefore reduces damage caused by invalid execution data received via the Internet 107.

Moreover, in the present embodiment described above, execution of execution data received from the PC 102 to which a private IP address is applied is permitted. Also, execution of execution data received from the PC 103 to which an IP address belonging to the same network as an IP address of the MFP 101 is permitted. Namely, execution of highly reliable execution data received from an apparatus that ensures a certain level of security in data communications is permitted. This reduces damage caused by invalid execution data received via the Internet 107 and thus avoids a situation in which highly reliable execution data is not executed and processing on the execution data is delayed.

Further, in the present embodiment described above, when the IP address of the MFP 101 is a global IP address, notification that execution of received execution data is to be restricted is provided. This reliably enables the user to know that execution of received execution data is to be restricted.

In the present embodiment described above, execution data is print data for executing a print job. This avoids a situation in which sheets are wasted by producing a large amount of prints when a large amount of invalid print data is received via the Internet 107.

It should be noted that the determination rules may be set without displaying the confirmation screen 401. For example, in the process in FIG. 3, when it is determined in the step S304 that the IP address of the MFP 101 is a global IP address, the CPU 108 carries out the processes in the step S307 and the subsequent steps. This enables the setting of determination rules appropriate to the IP address of the MFP 101 to take effect at the moment when the IP address is assigned to the MFP 101. As a result, execution of execution data is properly restricted from the moment when the IP address is assigned to the MFP 101.

A description will now be given of an information processing apparatus according to a second embodiment of the present invention.

The second embodiment of the present invention is basically the same as the first embodiment in terms of constructions and operations. The second embodiment of the present invention, however, differs from the first embodiment in that an MFP has a firewall setting module, and hence features of constructions and operations that are the same as those in the first embodiment will thus not be described, only constructions and operations different from those of the first embodiment being described below.

Figure 5:
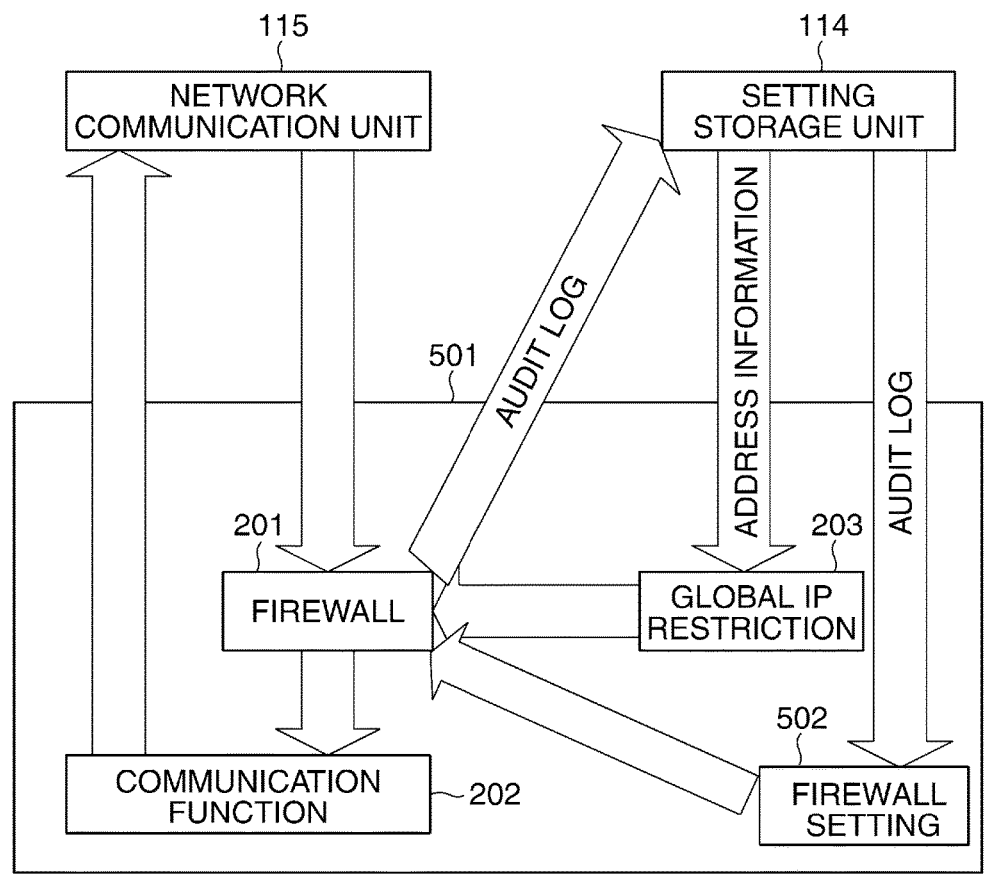
FIG. 5 is a block diagram schematically showing an arrangement of software modules of an MFP according to a second embodiment of the present invention.

FIG. 5 is a block diagram schematically showing an arrangement of software modules 501 of an MFP 501 according to the second embodiment of the present invention.

Referring to FIG. 5, the software modules 501 include a firewall setting module 502 as well as the firewall module 201, the communication function module 202, and the global IP restriction module 203 in FIG. 2. The processes of the software modules 501 are carried out by the CPU 108 executing programs stored in the storage device 110.

In the software modules 501, the firewall module 201 stores a result of determination as to whether or not to execute received execution data in an audit log in Table 3 and stores the audit log in the setting storage unit 114.

TABLE 3

| ACCEPT SRC = 111.112.113.224 DST = 111.112.113.114 |
| DROP SRC = 114.115.116.228 DST = 111.112.113.114 |
| DROP SCR = 111.112.114.225 DST = 111.112.113.114 |

In the audit log, information in a row starting with "ACCEPT" represents an IP address of a sender of execution data, for which it has been determined that the execution data is to be executed and which has been output to the communication function module 202, as well as an IP address of the MFP 101. Information in a row starting with "DROP" represents an IP address of a sender of execution data, for which it has been determined that the execution data is not to be executed and which has not been output to the communication function module 202 (hereafter referred to as "unexecuted data"), as well as the IP address of the MFP 101.

Figure 6:
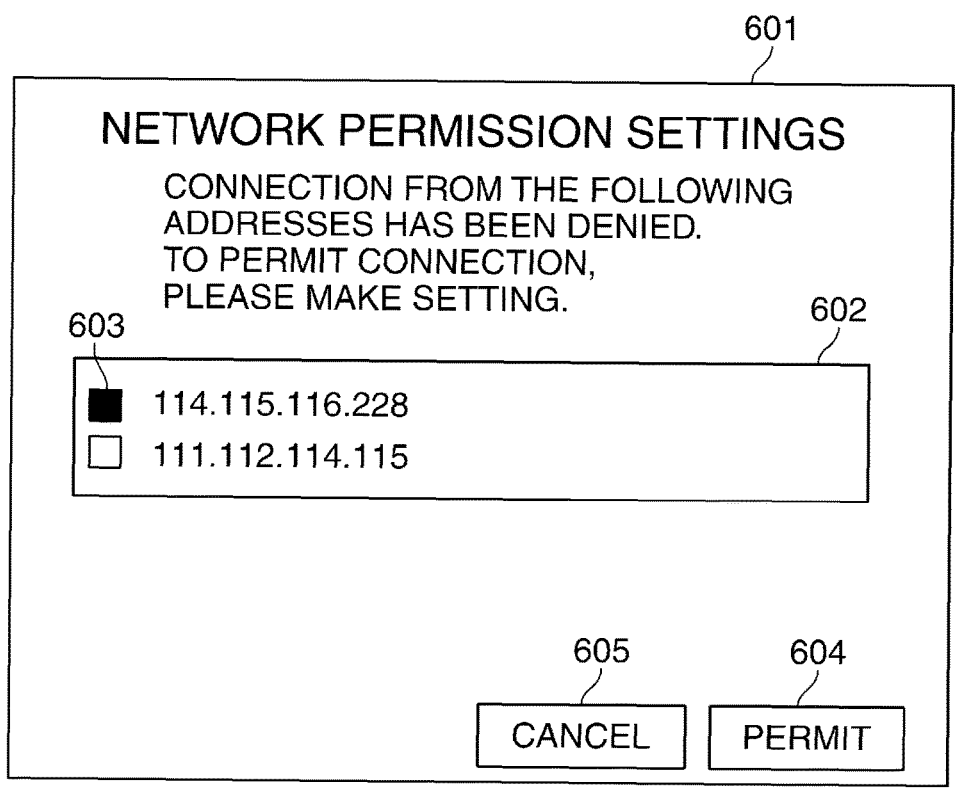
FIG. 6 is a view showing an example of a selecting screen which is displayed on the operating unit in FIG. 1.

The firewall setting module 502 obtains the audit log from the setting storage unit 114 and creates a list of senders of unexecuted data based on the obtained audit log. As a result, the CPU 108 displays, on the operating unit 113, a selection screen 601 in FIG. 6 which prompts the user to select an IP address of an apparatus for which execution is permitted (hereafter referred to as "the user-permitted IP address") from among the senders of the unexecuted data. The selection screen 601 has a list 602, a permit button 604, and a cancel button 605. In the list 602, the IP addresses of the senders of the unexecuted data and checkboxes 603 for selecting the IP addresses are displayed in list form. The permit button 604 is for issuing an instruction to set the IP address for which the checkbox 603 is selected as the user-permitted IP address. The cancel button 605 is for issuing an instruction to cancel the setting on the selection screen 601. When the user selects the checkbox 603 for any of the IP addresses and selects the permit button 604, the CPU 108 newly adds Rule 4 to the determination rules as shown in Table 4 below.

TABLE 4

| Rule 1 | All of received data | Deny |
| Rule 2 | Received from a private IP address | Permit |
| Rule 3 | Received from the same network | Permit |
| Rule 4 | Received from an additional IP address | Permit |

Rule 4 indicates that execution of execution data received from the IP address selected on the selection screen 601 is permitted. As a result, when execution data that applies to neither Rule 2 nor Rule 3 but is highly reliable is received, execution of the execution data is easily permitted.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-040454, filed Mar. 3, 2017 which is hereby incorporated by reference herein in its entirety.

What is claimed is:

1. An information processing apparatus that carries out either communications using a public network or communications without using the public network with an external apparatus, comprising:
   a storage device that stores an IP address assigned to the information processing apparatus;
   a network interface that receives print data for printing from the external apparatus;
   at least one memory that stores a set of instructions; and
   at least one processor that executes the instructions, the instructions, when executed, causing the information processing apparatus to perform operations comprising:
      restricting printing of the print data when the IP address assigned to the information processing apparatus is a global IP address that is for use in the communications using the public network; and
      permitting printing of the print data when the IP address assigned to the information processing apparatus indicates a same network as an IP address assigned to the external apparatus.

2. The information processing apparatus according to claim 1, wherein the printing of print data received from an external apparatus, to which a private IP address for use in the communications carried out without using the public network is assigned, is permitted.

3. The information processing apparatus according to claim 1, wherein the instructions to be executed by the processor further include an instruction for, when the IP address assigned to the information processing apparatus is a global IP address that is for use in the communications using the public network, providing notification that printing of the print data is to be restricted.

4. The information processing apparatus according to claim 1, wherein the instructions to be executed by the processor further include an instruction for prompting a user to select whether or not to permit printing of print data received from an external apparatus to which an IP address indicating a network different from that indicated by the IP address assigned to the information processing apparatus is assigned.

5. The information processing apparatus according to claim 1, wherein the information processing apparatus is an image forming apparatus that carries out an image forming process.

6. The information processing apparatus according to claim 1, wherein the instructions to be executed by the processor further include an instruction for:
   restricting providing of an operation screen to the external apparatus when the IP address assigned to the information processing apparatus is the global IP address that is for use in the communications using the public network; and
   permitting providing of the operation screen to the external apparatus when the IP address assigned to the information processing apparatus indicates a same network as an IP address assigned to the external apparatus.

7. A control method for an information processing apparatus that carries out either communications using a public network or communications without using the public network with an external apparatus, comprising:
   storing an IP address assigned to the information processing apparatus;
   receiving print data for printing from the external apparatus;
   restricting printing of the print data when the IP address assigned to the information processing apparatus is a global IP address that is for use in the communications using the public network; and
   permitting printing of the print data when the IP address assigned to the information processing apparatus indicates a same network as an IP address assigned to the external apparatus.

8. A non-transitory computer-readable storage medium storing a program for causing a computer to execute a control method for an information processing apparatus that carries out either communications using a public network or communications without using the public network with an external apparatus, the control method comprising:
   storing an IP address assigned to the information processing apparatus;
   receiving print data for printing from the external apparatus;
   restricting printing of the print data when the IP address assigned to the information processing apparatus is a global IP address that is for use in the communications using the public network; and
   permitting printing of the print data when the IP address assigned to the information processing apparatus indicates a same network as an IP address assigned to the external apparatus.

9. An information processing apparatus comprising:
   a communication interface;
   at least one memory that stores a set of instructions; and
   at least one processor that executes the instructions, the instructions, when executed, causing the information processing apparatus to perform operations comprising:
      determining whether or not the IP address assigned to the information processing apparatus is a global IP address;
      deleting data received from an external apparatus via the communication interface based on the determination that the IP address assigned to the information processing apparatus is the global IP address; and
      executing a process regarding data received from the external apparatus via the communication interface based on the determination that the IP address assigned to the information processing apparatus is not the global IP address.

* * * * *